United States Patent
Hild et al.

(10) Patent No.: US 12,312,420 B2
(45) Date of Patent: *May 27, 2025

(54) PROCESS FOR PRODUCING A CROSSLINKED CELLULOSE ETHER

(71) Applicant: Dow Global Technologies LLC, Midland, MI (US)

(72) Inventors: Alexandra Hild, Soltau (DE); Jöerg Neubauer, Hamburg (DE); Steffen Schmidt, Bomlitz (DE); Robert Baumann, Rueschlikon (CH)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 672 days.

This patent is subject to a terminal disclaimer.

(21) Appl. No.: 17/428,774

(22) PCT Filed: Apr. 17, 2020

(86) PCT No.: PCT/US2020/028677
§ 371 (c)(1),
(2) Date: Aug. 5, 2021

(87) PCT Pub. No.: WO2020/223040
PCT Pub. Date: Nov. 5, 2020

(65) Prior Publication Data
US 2022/0106411 A1    Apr. 7, 2022

Related U.S. Application Data

(60) Provisional application No. 62/841,391, filed on May 1, 2019.

(51) Int. Cl.
*C08B 15/00* (2006.01)
*C04B 24/38* (2006.01)

(52) U.S. Cl.
CPC .......... *C08B 15/005* (2013.01); *C04B 24/386* (2013.01)

(58) Field of Classification Search
CPC ....... C08B 15/005; C08B 11/02; C08B 11/08; C08B 11/20; C04B 24/386; C04B 24/383; C04B 28/02; C04B 28/14; C04B 40/0608; C04B 2103/0062; C04B 20/023
See application file for complete search history.

(56) References Cited

U.S. PATENT DOCUMENTS

| | | | |
|---|---|---|---|
| 4,068,068 A | 1/1978 | Holst et al. | |
| 4,175,183 A | 11/1979 | Ayers et al. | |
| 4,321,367 A | 3/1982 | Cheng et al. | |
| 6,235,893 B1 | 5/2001 | Reibert et al. | |
| 6,958,393 B2 | 10/2005 | Schlesiger et al. | |
| 9,175,097 B2 | 11/2015 | Bon Betemps et al. | |
| 9,828,725 B1 | 11/2017 | Hamed et al. | |
| 10,851,181 B2 | 12/2020 | Aoki et al. | |
| 2005/0034636 A1 | 2/2005 | Schlesiger et al. | |
| 2012/0095206 A1 | 4/2012 | Chen et al. | |
| 2016/0310522 A1 | 10/2016 | Jian et al. | |
| 2017/0210669 A1 | 7/2017 | Gu et al. | |
| 2020/0230557 A1 | 7/2020 | Van Der Kruijs et al. | |

FOREIGN PATENT DOCUMENTS

| | | | | |
|---|---|---|---|---|
| EP | 2011816 B1 | | 9/2016 | |
| JP | 2011195789 A | * | 10/2011 | |
| JP | 2017048296 | | 3/2017 | |
| JP | 6181976 B2 | | 8/2017 | |
| KR | 2013067748 | | 6/2013 | |
| WO | 2009127605 | | 10/2009 | |
| WO | 2015165588 | | 11/2015 | |
| WO | WO-2015165588 A1 | * | 11/2015 | ............ C08B 11/00 |
| WO | 2017004119 | | 1/2017 | |
| WO | 2017004120 | | 1/2017 | |
| WO | 2017141910 | | 8/2017 | |

OTHER PUBLICATIONS

Machine Translation of JP2011195789A (Year: 2011).*
U.S. Appl. No. 17/310,470 claim set (Year: 2024).*
U.S. Appl. No. 17/310,470 ADS (Year: 2021).*
Bartelmus, "Die Analytik von Celluseathergruppen" Z. Anal. Chem, 1976, Abstract, vol. 286.
Donges, "Non-Ionic cellulose Ethers", British Polymer Journal, 1990, pp. 315-326, vol. 23.
Jones, Crosslinking of Cotton Cellulose with Diglycidyl Ether, Journal of Applied polymer science, 1961, pp. 714-720 vol. V, issue No. 18.

* cited by examiner

*Primary Examiner* — Yih-Horng Shiao
*Assistant Examiner* — Hoi Yan Lee

(57) ABSTRACT

A process for producing a crosslinked cellulose ether including contacting an activated cellulose material with (i) an aqueous crosslinking agent emulsion, wherein the aqueous crosslinking agent emulsion is a mixture of (ia) at least one crosslinking agent; (ib) water; and (ic) any other optional components desired; and (ii) at least one etherification reagent; wherein the aqueous crosslinking agent emulsion (i) and the at least one etherification reagent (ii) react with the activated cellulose material to form the crosslinked cellulose ether; and a crosslinked cellulose ether produced by the above process.

13 Claims, 1 Drawing Sheet

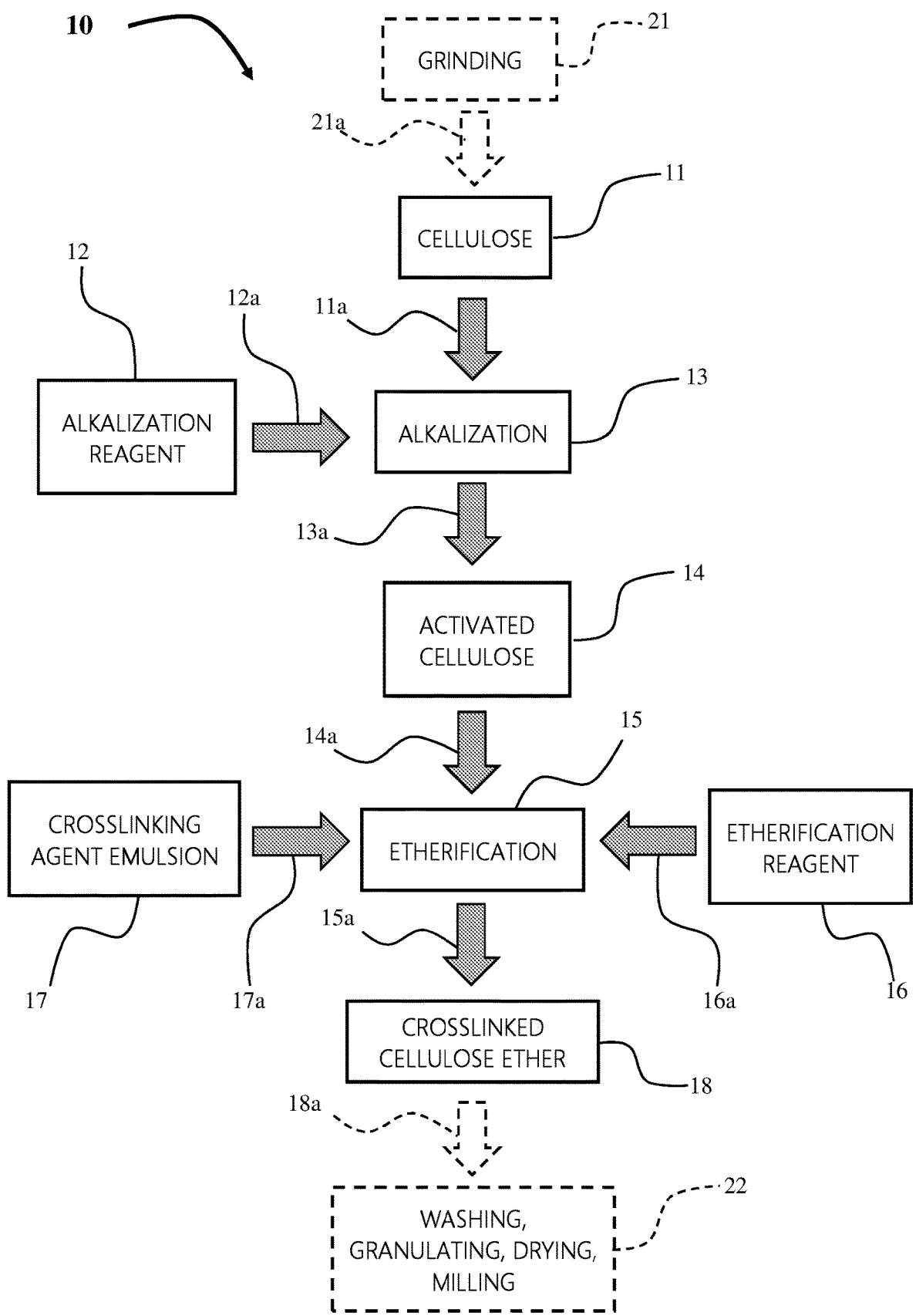

PROCESS FOR PRODUCING A CROSSLINKED CELLULOSE ETHER

FIELD

The present invention relates to a process for producing a crosslinked cellulose ether and a crosslinked cellulose ether prepared by such process.

BACKGROUND

Cellulose derivatives, such as cellulose ethers owing to their excellent properties and physiological safety, are used widely, for example as thickeners, adhesives, binders and dispersants, water retention agents, protective colloids, stabilizers, and suspension, emulsifying and film-forming agents. In addition, cellulose ethers are known to be employed in drymix mortars in various construction applications to improve the rheology of the mortar. Also, cellulose ethers are used in mortars to impart water retention properties that limit loss of water from the mortar to absorbing substrates. This ensures that the hydraulic binder (cement or gypsum) has sufficient water available during the setting reaction resulting in high mechanical strength of the final product. The lack of water would result in incomplete setting, poor mechanical strength, crack formation and low abrasion resistance.

Heretofore, cellulose ethers have been produced by well-known conventional processes which includes subjecting a cellulose starting material, such as cellulose pulp, to two process operations (steps or stages): (1) an alkalization operation and (2) an etherification operation. The well-known state-of-the-art conventional procedure for making a cellulose ether, is illustrated and described, for example, in U.S. Pat. No. 6,235,893 B1. The conventional process includes the steps of: (1) alkalizing a cellulose pulp; and (2) etherifying the alkalized cellulose pulp to form a cellulose ether. For example, in the conventional processes, the cellulose pulp is alkalized with sodium hydroxide and etherified with methyl chloride and alkylene oxide (ethylene oxide or propylene oxide). And, each one of the above operations of alkalization and etherification can be carried out stepwise, i.e. in one step or in two or more distinct and separate steps, and each step can be carried out for a predetermined period of time at specified process conditions of pressure and temperature. After the cellulose ether is made, the cellulose ether can be subjected to further desired process steps such as: (3) washing the cellulose ether; (4) drying the cellulose ether; and (5) milling the cellulose ether to a particulate form. Typically, the alkalization and etherification operations can be carried out in a single reactor or two or more reactors.

More recently, improvements have been made to conventional processes for making cellulose ethers by using crosslinking technology to make crosslinked cellulose ethers. Crosslinking technology involves cellulose ethers that can be chain extended or crosslinked using bifunctional crosslinking agents like methylene dichloride, epichlorohydrin or various diglycidylethers. For example, U.S. Pat. No. 6,958,393 B2 (equivalent to EP1384727B9) discloses a method of making a polyether group containing crosslinked cellulose ether using crosslinking technology. The crosslinked cellulose ether is produced by crosslinking a cellulose ether at 90 degrees Celsius (° C.) or less, in an inert atmosphere, e.g. nitrogen ($N_2$), in the presence of a polyether group containing crosslinking agent and in the presence of caustic or alkali. The crosslinking of the cellulose ether takes place in a reactor in which the cellulose ether itself is made and in the presence of the caustic or alkali.

One advantage of using a crosslinked cellulose ether, for example in a drymix mortar formulation, as opposed to a pure non-crosslinked cellulose ether is that by crosslinking a cellulose ether with a crosslinking agent, the viscosity of the aqueous solution of a cellulose ether can be increased and the resultant crosslinked cellulose ether having an increased or high viscosity can still remain water-soluble in an aqueous solution. And, a crosslinked cellulose ether having an increased or high viscosity, produced using crosslinking technology, can be used, for example in mortar applications, at a reduced dosage level without compromising product and application performance. Cellulose ether is a relatively expensive ingredient used in mortar formulations, and any reduction of the cellulose ether dosage in the formulation can save formulation costs.

In previously known processes, the dosage of a crosslinking agent, used in crosslinking a cellulose ether, is kept very low so as to prevent "over crosslinking" which, in turn, provides a polymer product which remains water-insoluble and does not contribute to the viscosity of the aqueous solution. However, a uniform distribution of a small amount of crosslinking agent, added to the contents of a large reactor, is very difficult to realize using the previously known processes.

"Over crosslinking" herein, with reference to crosslinking a cellulose ether, means that the reaction of the cellulose ether with a crosslinking agent is too extensive and results in a 3-dimensional network of covalently linked cellulose ether chains; and such chains are not water soluble and appear as gel particles in an aqueous phase. Over crosslinking results in a reduction of water solubility of the cellulose ether in the aqueous solution. When over crosslinking occurs in a cellulose ether a reduced amount of the resulting crosslinked cellulose ether is soluble in the aqueous solution; and the appropriate viscosity of the crosslinked cellulose ether is unable to be achieved in the aqueous solution. In other words, over crosslinking results in an undesirable decrease in viscosity. An over crosslinked cellulose ether shows a degree of crosslinking that results in a reduced water solubility compared to a non-over crosslinked cellulose ether.

The known process for crosslinking a cellulose ether described, for example, in U.S. Pat. No. 6,958,393 B2 includes several steps such as: (1) a cellulose is alkalized with aqueous alkali metal hydroxide solution in the presence of a suspension medium; (2) the alkalized cellulose is reacted with one or more alkylene oxides; (3) the alkalized cellulose is reacted with an alkyl halide present in the suspension medium; (4) subsequently or simultaneously, the alkalized cellulose is reacted with a crosslinking agent using a specified amount of crosslinking agent; (5) further alkali metal hydroxide and/or alkalization reagent is added to the reaction mixture of step (4); and (6) the resultant crosslinked cellulose ether is purified and dried.

The process described in U.S. Pat. No. 6,958,393 B2 requires: (1) the addition of a crosslinking agent during the etherification step of the process at a high pressure; (2) the use of epichlorohydrin (ECH) as a crosslinking agent in some instances; (3) the addition of a low level of crosslinking agent in a pure state or dispersed in an organic solvent; (4) the uniform distribution of the crosslinking agent at the limited low level of pure crosslinking agent; and (5) the exhibition of good performance of the resulting products of the process. In addition to the above requirements, the use of the above known process, in some instances, has resulted in poor distribution of the crosslinking agent in the reactor; and has developed over-crosslinking and an undesirable decrease in viscosity of the crosslinked cellulose product. And, the efficiencies of the known process of U.S. Pat. No. 6,958,393 B2 do not readily transfer from the laboratory scale, to the pilot plant scale, and/or ultimately to the full-size industrial plant scale. Thus, a greater degree of expertise, knowledge, technical effort is needed to make the above known process work on a plant scale; and under the conditions of the known process.

It has been found that to carry out a successful crosslinking process, it is necessary to achieve a uniform distribution of the crosslinking agent when the crosslinking agent is introduced into the process at a low amount. The uniform distribution has to be achieved to create the desired branched polymer and to prevent local over dosage which leads to over crosslinking. Over crosslinking (i.e., high levels of crosslinking) leads to localized crosslinked networks and increased levels of local insoluble materials. It has also been found that over crosslinking may depend on when and at what stage, step or operation of the crosslinked cellulose ether production process a crosslinking agent is introduced into the process. For example, a crosslinking agent might be introduced or added before, during, or after the etherification operation. However, since the alkalization and etherification reactions are exothermic, there are many factors that can affect whether or not over crosslinking occurs in the process. Factors can include, for example, the reaction time, type of crosslinking agent introduced into the process, the amount of crosslinking agent introduced into the process, how the crosslinking agent is introduced into the process, the process conditions at the point of introducing the crosslinking agent into the process, and over what period of time is the crosslinking agent introduced into the process.

It is desired, therefore, to provide a new improved process for producing a crosslinked cellulose ether that can be useful and implemented on an industrial plant scale with a higher efficiency than known conventional processes; and at the same time, wherein the performance of the resulting product of such improved process remains the same or better than known products of conventional processes.

SUMMARY

The problems of the prior art processes can be solved using the process of the present invention. The present invention is directed to a novel process for preparing a crosslinked cellulose ether (herein referred to as "XCE") having an appropriate increased viscosity.

The present invention is directed to a process for producing a XCE including contacting an activated cellulose material with (i) an aqueous crosslinking agent emulsion; and (ii) at least one etherification reagent; wherein the aqueous crosslinking agent emulsion and the at least one etherification reagent form a reaction mixture which reacts with the activated cellulose material to form the XCE. The XCE formed includes, for example, a hydroxyethylmethyl cellulose derivative. The XCE forms in the presence of the at least one crosslinking agent present in the aqueous crosslinking agent emulsion. In one preferred embodiment, the aqueous crosslinking agent emulsion comprises: (ia) at least one crosslinking agent; (ib) water; and (ic) any other optional components desired.

In another preferred embodiment, the present invention is directed to a process for producing a XCE including the steps of: (A) mixing at least one crosslinking agent with water to form an aqueous crosslinking agent emulsion; (B) contacting an activated cellulose material with (Bi) the crosslinking agent emulsion of step (A) and (Bii) at least one etherification reagent to form a reaction mixture which reacts with the activated cellulose material to form the XCE; and (C) optionally, carrying out one or more steps of purifying, washing, drying, granulating, and milling the XCE from step (C).

In still another preferred embodiment, the aqueous crosslinking agent emulsion is introduced or added to the process during the etherification operation.

In yet another embodiment, the present invention is directed to a XCE produced by the above process. The XCE produced by the above process of the present invention beneficially has high water solubility leading to an increased viscosity in aqueous solution when compared to the non-crosslinked cellulose ether.

Even still another embodiment of the present invention relates to a drymix mortar-forming composition including the above XCE.

Use of the present invention process provides an efficient production process for making a XCE. Surprisingly, it has been discovered that crosslinking agents such as diglycidylethers can be easily dispersed in water; and the resulting aqueous dispersion can be easily distributed over the whole contents of a large reactor providing a more uniform distribution of crosslinking agent in the contents of the reactor. Thus, partial formation of over-crosslinked particles which are not water soluble can be avoided. Because no over-crosslinked particles are produced, the use of crosslinking agents is much more effective in an aqueous dispersion than in an organic solvent; and the overall dosage of the crosslinking agent can be reduced while the effectiveness of the crosslinking agent remains excellent.

Some other benefits of the present invention process include, for example, (1) no over crosslinking (only a desired viscosity increase) in a large scale plant process; (2) the crosslinking agent has a low water solubility and forms a water emulsion; (3) a low amount of crosslinking agent is required in the process providing a significant reduction of crosslinking agent dosage; and (4) a uniform distribution of the low amount of crosslinking agent is possible in a large plant scale process. Furthermore, advantageously the process of the present invention provides a XCE product with the same or better performance properties of known products prepared by known processes. In addition, advantageously the process of the present invention can be performed on a large plant scale with the crosslinking agent dosage taking place at the etherification step of the present invention process and without the problem of over-crosslinking.

BRIEF DESCRIPTION OF THE DRAWINGS

FIG. 1 is a schematic flow diagram showing a process of the present invention.

DETAILED DESCRIPTION

A "uniform distribution" in the present disclosure and with reference to contacting a cellulose fiber to a different component, herein means the cellulose fiber and the other component have the same distribution in all smallest volume elements of a given volume. The smallest volume element is a cube with an edge length of ten times the mean particle size of the cellulose fiber in the given volume.

An "aqueous crosslinking agent emulsion" in the present disclosure herein means a beneficial composition comprising a combination of at least one crosslinking agent and water that exhibits the advantageous properties of being easily prepared and being uniformly distributed in an activated cellulose material during etherification. The aqueous crosslinking agent emulsion of the present invention is also non-toxic; and provides a XCE having a desirable viscosity increase such that the final XCE product is water-soluble in an aqueous solution. The use of the aqueous crosslinking agent emulsion of the present invention also advantageously prevents, or at least minimizes, over crosslinking during etherification.

In general, a process for producing a XCE includes an alkalization step and an etherification step. A grinding step can be carried out, and is typically desired, prior to the alkalization step; and a washing with water (hot $H_2O$)/granulation step and/or a drying/milling step can be carried out after the etherification step. In the etherification step of the process, a crosslinking agent is added to the etherification operation to provide crosslinking of the cellulose ether during the etherification step.

In one broad embodiment, the present invention relates to the crosslinking agent dosage and crosslinking agent addition to the process for producing a XCE product. In one preferred embodiment, the crosslinking agent is added to, or dosed into, the etherification step or operation of the process in the form of an emulsion.

The small dosage of crosslinking agent used in the present invention results in an ultra-high viscous product with the same rheological performance as known products (e.g., a high viscosity level measured in millipascal seconds [mPa·s]) but with a crosslinking agent having a higher efficiency. Advantageously, the result is a reduced level of undesired side reactions and minimum impact on waste water treatment. Also, in the present invention, the dosage of costly crosslinking agents is reduced and over-crosslinking is prevented.

The crosslinking agent dosage used in the present invention has the benefit of using water as a suspension medium for the crosslinking agent, so the objective of uniform distribution can be done more easily compared to conventional processes. In addition, the present invention using an aqueous crosslinking agent emulsion does not have the safety issues and environmental concerns in a XCE manufacturing plant as do the processes known in the art which use an organic solvent as a diluting agent for a crosslinking agent.

Further benefits of the present invention process include, for example, (1) the process uses a readily available crosslinking agent based on diglycidyl ether chemistry such as Epilox M 985 or Epilox P13-42; (2); the emulsion is non-toxic, has a very high boiling point, and has a high molecular weight (Mw) (e.g., above 600 grams per mole [g/mol]). In contrast, known processes use epichlorohydrin (ECH) as the crosslinking agent system; and such known processes suffer from several disadvantages, including, for example, epichlorohydrin is known to be toxic, is a carcinogenic, and has a low boiling point (116° C.)/low Mw (92.53 g/mol). Table I describes a comparison of the physical data of Epilox products versus epichlorohydrin.

TABLE I

Physical Data of Crosslinking Agents

| Cross-linking Agent | Density (g/cm³ at [@] 20° C.) | Dynamic Viscosity (mPa · s, @25° C.) | Solubility in Water (grams/liter [g/L], @25° C.) | Boiling Point (° C.) | Molar Mass (g/mol) |
|---|---|---|---|---|---|
| Epilox M 985 | 1.06-1.06 | 40-90 | less than 100 | greater than 200 | 850-1,000 |
| Epilox P13-42 | 1.04 | 40-70 | less than 100 | greater than 200 | 610-700 |
| Epichlorohydrin | 1.18 | 1.03 | 65.9 | 117 | 92.5 |

The process of the present invention provides an irreversibly cross-linked cellulose ethers with beneficial rheological behavior and advantageous in various fields of application. The present invention uses C10-C24 alkyl bifunctional compounds (oxiranes and/or halides) or polypropylene glycol diglycidyl ethers as crosslinking agents to prepare a XCE. The process of the present invention uses an aqueous emulsion to introduce the crosslinking agent into the etherification step of the process. Prior art processes that use ECH as a crosslinking agent to prepare a XCE results often in insoluble cross-linked products; and, the crosslinking agent is less of an environmental concern than ECH.

Generally, the crosslinking agent dispersion or emulsion composition useful in the present invention includes a mixture of: (i) a crosslinking agent and (ii) water; and (iii) any other optional components desired.

The crosslinking agent (or crosslinking agent) that is used to prepare the cellulose ether of the present invention includes, for example, one or more crosslinking agents known in the art. However, in a preferred embodiment, the crosslinking agent useful in the present invention, in general, is a non-water soluble or poorly water soluble crosslinking agent. Because the crosslinking agent in the preferred embodiment is added to the process with water, it is desired to use a crosslinking agent that is non-water soluble or has a solubility of less than (<) 10 percent (%) in water to prevent, for example, the occurrence of hydrolysis and other undesired side reactions. By "non-water soluble", with reference to a crosslinking agent, it is meant a crosslinking agent having no water solubility or having a low (weak or poor) water solubility of <10%. In other embodiments, the water solubility of the crosslinking agent can be from 0% to <9% and from 0% to <8%. The water solubility of the crosslinking agent can be measured by turbidity analysis as known in the art.

For example, the non-water solubility property of the crosslinking agent allows optimization of desirable side reactions with the hydroxyl (—OH) groups of the cellulose backbone to take place and minimizes the undesirable side reactions with the —OH groups of the sodium hydroxide (NaOH) used in the alkalization operation.

Crosslinking agents suitable for use in the present invention include, for example, compounds having a polyoxyalkylene or polyalkylene glycol group and two or more, preferably, two crosslinking groups, such as halogen groups, glycidyl or epoxy groups, or ethylenically unsaturated groups, e. g. vinyl groups, that form ether bonds with the cellulose ether in crosslinking the cellulose ether. Suitable bifunctional compounds include, for example, 1,2-dichloro (poly) alkoxy ethers, dichloropolyoxyethylene, diglycidyl polyalkoxy ethers, diglycidyl phosphonate, divinyl polyoxyalkylenes containing a sulphone group; and mixtures thereof. Compounds which bear two different functional groups can also be used. Examples of the compounds containing two different functional groups include; epichlorohydrin, glycidyl (poly) oxyalkyl methacrylate; and mixtures thereof.

In one preferred embodiment, the crosslinking agent useful in the present invention can be based on diglycidyl ether chemistry. For example, the crosslinking agent can be a diglycidylether type crosslinking agent as illustrated by the following chemical Structure (I):

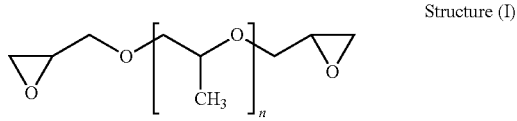

Structure (I)

where, in the above Structure (I), "n" can be from 3 to 25 in one embodiment, from 7 to 20 in another embodiment, and from 9 to 15 in still another embodiment.

Exemplary of some of the commercial crosslinking agents useful in the present invention, for example, crosslinking agents based on diglycidyl ether chemistry, include Epilox P13-42 and Epilox M 985 (both available from Leuna-Harze GmbH). Epilox M 985 poly(propyleneglycol) diglycidylether crosslinking agent is a linear poly (propyleneglycol) diglycidylether made from polypropylene glycol (PPG).

With the use of crosslinking agents, such as Epilox M 985, the building-up of real covalent bindings takes place. This building of covalent bindings advantageously enhances the cellulose backbone of a cellulose ether. The cellulose ether with an enhanced cellulose backbone of the present invention, provides a means for reaching beneficial properties such as increased viscosity of the aqueous solution. For instance, crosslinking agents such as Epilox M 985 and Epilox P13-42 are preferred embodiments because such crosslinking agents provide beneficial properties. For example, the preferred crosslinking agents: (1) are non-toxic; and (2) have a high boiling point (e.g., greater than (>) 200° C.) and a high Mw (e.g., above 600 g/mol). This is in contrast to some of the known crosslinking agent systems used in the prior art, such as epichlorohydrin, which: (1) is toxic and/or carcinogenic; (2) has a low boiling point (e.g., 116° C.) and a low Mw (e.g., 92.53 g/mol); and (3) shows no desired viscosity increase.

In addition, when using the XCE of the present invention, the amount of the XCE necessary to obtain the desired performance, for example when used in a mortar formulation, is reduced compared to a non-crosslinked cellulose ether. Such reduction of XCE dosage, in turn, reduces the cost in use that correlates with the reduce amount of cellulose ether that is necessary to obtain the desired performance, for example, in the application of cementitious tile adhesives.

In general, the amount of crosslinking agent emulsion used in the process of the present invention may range from 0.0001 eq to 0.05 eq, where the unit "eq" represents the molar ratio of moles of the crosslinking agent relative to the number of moles of anhydroglucose units (AGU) of the cellulose ether. In other embodiments, the amount of crosslinking agent used in the process is, for example, from 0.0005 eq to 0.03 eq in one embodiment and from 0.001 eq to 0.005 eq in another embodiment. When the amount of crosslinking agent used is above 0.05 eq, over-crosslinking can occur and thus, the XCE produced becomes insoluble. When the amount of crosslinking agent used is below 0.0001 eq, a viscosity increase in, for example a 1% solution, may not be detectable.

The water used to form the crosslinking agent emulsion is obtained from any source. The different types of water include, for example, tap water, potable water, and deionized water.

The crosslinking agent emulsion is formed by mixing the crosslinking agent and water by conventional mixing means prior to or just before adding the emulsion to the etherification step of the process of making the XCE of the present invention. In one preferred embodiment, the crosslinking agent is dosed, for example, as a 50% emulsion in water. For example, the amount of crosslinking agent in water is from 10 weight percent (wt %) to 90 wt % in one embodiment, from 20 wt % to 80 wt % in another embodiment and from 30 wt % to 70 wt % in still another embodiment.

In one general embodiment, the process of producing the crosslinking agent emulsion useful in the present invention includes: mixing (a) at least one crosslinking agent with (b) water to form the crosslinking agent emulsion. The mixing of the crosslinking agent and water to form the emulsion is carried out by any conventional mixing means such as any horizontal or vertical mixing device; or the mixing can take place by pumping the crosslinking agent into the water; or a combination of the feeding lines of water and crosslinking agent.

Exemplary of one of the advantageous properties exhibited by the crosslinking agent emulsion includes the emulsion is easily and uniformly distributed on the activated cellulose material during etherification.

One broad embodiment, the process of producing the XCE from a cellulose starting material includes the steps of: (A) mixing at least one crosslinking agent with water to form an aqueous crosslinking agent emulsion as described above; and (B) contacting an activated cellulose material with (Bi) the crosslinking agent emulsion of step (A) and (Bii) at least one etherification reagent to form a reaction mixture which thereby reacts to form a XCE such that the XCE forms in the presence of the at least one crosslinking agent.

With reference to FIG. 1, there is shown a process of the present invention, generally indicated by reference numeral 10, with various general process operations or steps for producing a XCE having enhanced viscosity of the aqueous solution and useful, for example, in drymix mortar formulations. As shown in FIG. 1, the process includes, for example: a cellulose starting material 11 such as pulp and an alkalization reagent 12 that proceed, as indicated by arrows 11a and 12a, respectively, to an alkalization step 13. In the alkalization step 13, the alkalization reagent 12 is mixed with the cellulose material 11 to form, as indicated by arrow 13a, an activated cellulose 14. The formed activated cellulose 14 proceeds, as indicated by arrow 14a, to an etherification step 15. In the etherification step 15, an etherification reagent 16 is introduced into the etherification step 15, as indicated by arrow 16a, to form a cellulose ether. Also introduced into the etherification step 15, is an aqueous crosslinking agent emulsion 17 which is added, as indicated by arrow 17a, to the etherification step 15 wherein the crosslinking agent emulsion 17 contacts the activated cellulose ether 14 to form a XCE 18 that proceeds, as indicated by arrow 15a, from the etherification step 15.

With reference to FIG. 1 again, an optional grinding step 21, shown in dotted lines in FIG. 1, can be carried out to provide a ground particulate cellulose material which proceeds, as indicated by arrow 21a, to the cellulose material 11 which then proceeds, as indicated by arrow 11a, to the alkalization step 13. Although the grinding step 21 is optional, the grinding step 21 is typically used in a preferred embodiment such that the cellulose starting material 11 (e.g., wood pulp) can be ground to form a ground flock of cellulose which can easily flow and mixed in a reactor. The ground flock is also easily contacted with the alkalization reagent, such as by spraying the alkalization reagent onto the cellulose flock being mixed in the reactor using a conventional spraying means.

In another embodiment, the XCE 18 from the etherification step 15 can proceed, as indicated by arrow 18a, to one or more additional optional operations or steps 22, shown in dotted lines in FIG. 1. Although the steps 22 are optional, one or more of the steps 22 are typically desired and used in the process of the present invention. The optional steps 22 can be selected from, for example: (1) a water (hot $H_2O$) washing step for washing the XCE; (2) a granulation step for forming XCE granules; (3) a drying step for drying the granulated XCE; and (4) a milling step for forming the XCE into a powder product. Each of the above optional step can be carried out in a single step operation; or two or more of the above optional steps can be combined in one operation if desired.

For example, the XCE 18 after the etherification step 15 typically has unwanted volatile by-products and salt (NaCl); and thus, in a preferred embodiment, the XCE 18 after the etherification step 15 is processed, as indicated by arrow 18a, through a washing step 22 to wash out the unwanted volatile by-products, salt, and other impurities from the XCE followed by a drying step 22.

The starting raw material used to make the cellulose ether of the present invention is cellulose. Cellulose pulp is typically obtained from, for example, wood pulp or cotton linters pulp. The pulp is typically ground, using conventional grinding means, to provide the cellulose in a powder or flock form. In one preferred embodiment, the suitable cellulose starting material useful in the present invention includes ground wood pulp, ground linters cellulose, and mixtures thereof. In another preferred embodiment, wood pulp is used in the process; and the wood pulp is ground into a ground flock of cellulose as a means of making the cellulose feed more flowable when fed into the alkalization process step. Generally, the pulp is ground to an optimum size particle of, for example, from 1,000 microns ($\mu$m) to 10 $\mu$m in one embodiment, and from 900 $\mu$m to 20 $\mu$m in another embodiment. Coarser particles sizes can make the alkalization step less efficient and finer particles sizes can take too much time for grinding. Before the alkalization step the reactor is typically filled with the pulp flock.

The alkalized or "activated" cellulose material used to form a XCE, is produced by admixing at least one alkalization reagent (or alkalizing agent) with at least one cellulose material under conditions to form the activated cellulose material. The alkalization reagent useful during the alkalization step of the present invention process includes, for example, one or more alkalization reagents known in the art. However, for economic reasons, an alkali metal hydroxide such as an aqueous sodium hydroxide (NaOH) solution is used, in one preferred embodiment, as the alkalization reagent for the natural cellulose or the cellulose hydrate when carrying out the process of the present invention. In other embodiments, other aqueous alkaline solutions, for example, potassium hydroxide (KOH) or lithium hydroxide (LiOH) solutions, are also suitable for use as the alkalization reagent. In a preferred embodiment, the alkali metal hydroxide used in the present invention is a 50% caustic soda, available from The Dow Chemical Company.

Generally, the alkalization reagent is in the form of a mixture of the alkalization reagent in water; and the concentrations of the aqueous solutions may vary within wide limits. In some embodiments, appropriately the aqueous solution ranges from about 30 wt % to 70 wt % in one embodiment, from 40 wt % to 60 wt % in another embodiment and from 45 wt % to 55 wt % in still another embodiment. In a preferred embodiment, the aqueous solution is used as a 50% reagent in water.

The amount of the alkalization reagent added into the XCE production process is from 2 mol/mol AGU to 4 mol/mol AGU in one embodiment, from 2.5 mol/mol AGU to 3.5 mol/mol AGU in another embodiment, and from 2.7 mol/mol AGU to 3.2 mol/mol AGU in still another embodiment.

The alkalization step of the process is carried out under low pressure and low temperature conditions. For example, the pressure of the alkalization step is in the range of from 0 kilopascals (kPa) to 500 kPa in one embodiment, from 100 kPa to 400 kPa in another embodiment and from 200 kPa to 300 kPa in still another embodiment. The above pressure ranges are the typical pressure level ranges in the reactor during the alkalization step. And, for example, the temperature of the alkalization step of the process is in the range of from 10° C. to 50° C. in one embodiment, from 15° C. to 45° C. in another embodiment, and from 20° C. to 40° C. in still another embodiment. The above temperature ranges are the typical temperature ranges in the reactor during the alkalization step. Higher temperature used in the present invention process will result in an undesired pressure increase.

To produce a cellulose ether in accordance with the process of the present invention, an etherification reagent is mixed with the activated cellulose material prepared in the alkalization step described above. The etherification reagent used for preparing the cellulose ether includes, for example, one or more etherification reagents known in the art. For example, the etherification reagent includes ethylene oxide (EO), propylene oxide (PO), butylene oxide (BO), methyl chloride (MCl), ethyl chloride, chloroacetic acid, and mixtures thereof. In one preferred embodiment, the etherification reagent useful in the present invention is, for example, MCl, PO, EO, and mixtures thereof.

The amount of the etherification reagent added into the etherification operation of the XCE production process includes, for example, from 4 mol/AGU to 6 mol/AGU in one embodiment, from 4.5 mole/AGU to 5.5 mol/AGU in another embodiment and from 4.7 mol/AGU to 5.3 mol/AGU in still another embodiment. If the amount of etherification reagent used is <4 mol/AGU, the cellulose ether can be under-substituted and not fully water soluble. If the amount of etherification reagent used is >6 mol/AGU, this higher dosage of etherification reagent can cause the cellulose ether to become hydrophobic and water solubility decreases.

The etherification reagent added to the etherification step to contact the activated cellulose can be carried out by any known addition means, for example, by pumping the liquid compounds into the reactor.

The etherification step of the process is carried out, for example, in a reaction vessel (reactor) under an inert atmosphere. The inert material used in the process includes, for example, $N_2$, argon, and mixtures thereof. During the etherification step of the process and as the reaction of the reactants occurs and progresses to form a cellulose ether material, the pressure and temperature increase as a result of an exothermic reaction.

As the cellulose ether product forms during the etherification step, the pressure of the etherification step of the process is in the range of, for example, from 1,000 kPa to 3,500 kPa in one embodiment, from 1,500 kPa to 3,000 kPa in another embodiment and from 2,000 kPa to 2,500 kPa in still another embodiment. At a pressure <1,500 kPa, the reaction rate is too slow; and at a pressure >2,500 kPa, special high-pressure equipment is necessary.

The temperature of the etherification step of the process is the range of, for example, from 60° C. to 120° C. in one embodiment, from 70° C. to 110° C. in another embodiment and from 80° C. to 100° C. in still another embodiment. At a temperature <60° C., the reaction rate becomes unacceptably slow. At a temperature >100° C., unwanted side reactions can occur; and the pressure increases, and if the pressure increases beyond, for example, 2,500 kPa different pressure reactors which can handle high pressures and which are more expensive will be required.

The crosslinking action of the activated cellulose ether to produce the XCE of the present invention begins when the crosslinking agent emulsion of the present invention is added to the etherification operation of the process and as the etherification process step of the process proceeds. The above-described crosslinking agent emulsion is used in the crosslinking agent addition step of the present invention process; and the amount of crosslinking agent emulsion used in the process of the present invention is such that the crosslinking agent present in the etherification step is in the range of from 0.0001 eq to 0.05 eq as described above.

The crosslinking agent emulsion is added to the etherification step as the cellulose ether product forms during the etherification step. The pressure of the crosslinking agent emulsion addition step of the process is in the range of, for example, from 1,000 kPa to 3,500 kPa in one embodiment, from 1,500 kPa to 3,000 kPa in another embodiment and from 2,000 kPa to 2,500 kPa in still another embodiment.

The temperature of the crosslinking agent addition step of the process is in the range of, for example, from 60° C. to 120° C. in one embodiment, from 70° C. to 110° C. in another embodiment and from 80° C. to 100° C. in still another embodiment. At a temperature <60° C., the reaction rate becomes unacceptably slow; and at a temperature >100° C., unwanted side reactions can occur and the pressure increases. If the pressure increases beyond, for example, 3,000 kPa different pressure reactors which can handle high pressures and which are more expensive will be required.

In general, the crosslinking agent emulsion is added to the etherification step of the process and is mixed with the activated cellulose material; so that the etherification reagent used with the activated cellulose material in the etherification step forms a uniform reaction mixture. The uniformly distributed reaction mixture reacts to form a XCE product. The cellulose ether that is used in the crosslinking reaction with the crosslinking agent emulsion is typically a mixed cellulose ether that contains hydroxyalkyl groups and alkyl ether groups. For example, in one embodiment of a mixed cellulose ether that contains hydroxyalkyl groups and alkyl ether groups, includes an alkyl hydroxyethyl cellulose, such as hydroxyalkylmethyl cellulose.

In other embodiments, exemplary of cellulose ether compounds suitable for crosslinking include, methyl cellulose (MC), ethyl cellulose, propyl cellulose, butyl cellulose, hydroxyethylmethyl cellulose (HEMC), hydroxypropylmethyl cellulose (HPMC), hydroxyethyl cellulose (HEC), methylhydroxyethylhydroxypropyl cellulose (MHEHPC), ethylhydroxyethyl cellulose (EHEC), methylethylhydroxyethyl cellulose (MEHEC), hydrophobically modified ethylhydroxyethyl celluloses (HMEHEC), hydrophobically modified hydroxyethyl celluloses (HMHEC), sulfoethylmethylhydroxyethyl celluloses (SEMHEC), sulfoethylmethylhydroxypropyl celluloses (SEMHPC), sulfoethylhydroxyethyl celluloses (SEHEC), and mixtures thereof. In some preferred embodiments, the mixed cellulose ether can include, for example, HEMC, HPMC, and mixtures thereof.

For the cellulose ethers useful in the present invention, alkyl substitution is described in cellulose ether chemistry by the term "degree of substitution DS", as determined by the Zeisel method. The DS is the mean number of substituted OH groups per anhydroglucose unit. The methyl substitution may be reported, for example, as DS (methyl) or DS (M). The hydroxy alkyl substitution is described by the term "molar substitution MS", as determined by the Zeisel method. The MS is the mean number of moles of etherification reagent which are bound as ether per mol of anhydroglucose unit. Etherification with the etherification reagent EO is reported, for example, as MS (hydroxyethyl) or MS (HE). Etherification with the etherification reagent PO is correspondingly reported as MS (hydroxypropyl) or MS (HP). The side groups are determined using the Zeisel method (reference: G. Bartelmus and R. Ketterer, Z. Anal. Chem. 286 (1977), 161-190).

The XCE produced by the process of the present invention includes, for example, any of the above-mentioned cellulose ethers with a degree of alkyl substitution. For example, in one embodiment a crosslinked HEC has a degree of substitution MS (HE) of 1.5 to 4.5 and has a degree of substitution MS (HE) of 2.0 to 3.0 in another embodiment. In still another embodiment, mixed ethers of methyl cellulose to be crosslinked can be used in the process of the present invention. For example, in the case of HEMC, in one preferred embodiment, DS (M) values range from 1.2 to 2.1; from 1.3 to 1.7 in another embodiment; and from 1.35 to 1.6 in still another embodiment. In another preferred embodiment, MS (HE) values can range from 0.05 to 0.75; from 0.15 to 0.45 in another embodiment; and from 0.20 to 0.40 in still another embodiment. In the case of HPMC, in one preferred embodiment, DS (M) values can range from 1.2 to 2.1; and from 1.3 to 2.0 in another embodiment. In still another preferred embodiment, MS (HP) values can range from 0.1 to 1.5; and from 0.2 to 1.2 in another embodiment.

After the etherification step described above, the XCE product produced can be processed through various additional optional processing steps. For example, the resultant XCE can be washed or purified, granulated, dried and/or ground to a powder form using conventional methods customarily used to produce cellulose derivative products and powders therefrom. For example, before or after washing, the volatile organic constituents present in the XCE can be reduced or removed from the XCE product by distillation or steam stripping. The optional steps are well known to those skilled in the art.

Some of the advantageous properties exhibited by the XCE product made by the above process of the present invention can include, for example increased viscosity of the aqueous solution enabling reduced dosage in drymix mortar formulation without compromising the performance.

For example, the increased viscosity of the XCE aqueous solution produced by the process of the present invention includes a viscosity increase of >15% in one embodiment, >20% in another embodiment, >30% in still another embodiment, and >50% in yet another embodiment when compared to a non-crosslinked cellulose ether aqueous solution based on the same pulp source.

In one broad embodiment, the XCE of the present invention may be used as an additive for a drymix mortar formulation, renders, cement extrusion, and the like. For example, in the process of making the drymix mortar formulation, the process includes the steps of mixing: (A) the XCE described above which is used as a water retention agent; and (B) desired conventional drymix mortar formulation components such as a hydrolytic binder including for example, cement or gypsum.

In a preferred embodiment, a mortar formulation can be prepared mixing the components (A) and (B) (e.g., a physical blend of solid powders) by conventional mixing means as known in the art. Some of the advantageous properties exhibited by the mortar formulation can include, for example, the capability using a lower dosage of the XCE (>10%) resulting in lower formulation costs. To prepare the mortar formulation, generally, the amount of the XCE used as a water retention agent component (A) can be, for example, from 0.01 wt % to 1.0 wt % in one embodiment, from 0.05 wt % to 0.8 wt % in another embodiment and from 0.1 wt % to 0.5 wt % in still another embodiment. Below these levels the water retention of the mortar is insufficient and above these limits the cost of the formulation becomes too high.

The conventional drymix mortar formulation components, component (B), may include components such as hydrolytic binders such as cement, gypsum, fly ash, furnace slag, and the like, and aggregates (sand), fine fillers (calcium carbonate, fumed silica, dolomite, and the like), air entraining agent, defoamers, re-dispersible polymer powders, hydrophobic agents; and mixtures thereof.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) are explained as follows:

"HEMC" stands for hydroxyethylmethyl cellulose.

"AGU" stands for anhydroglucose units of the cellulose ether.

"LVN" stands for limiting viscosity number of the pulp as measured according to the procedure described in ISO 5351 (2010).

Various raw materials or ingredients used in the Examples are explained as follows:

Epilox M 985 is a poly(propylene glycol) diglycidylether available from Leuna Harze.

Examples of crosslinking compounds that can be used in the process of the present invention and that are based on diglycidyl ether are described in Eugene W. Jones, Crosslinking of Cotton Cellulose with Diglycidyl Ether, Journal of Applied polymer science, Vol. V, issue no 18, 714-720 (1961).

Test Methods
Insoluble Content

Cellulose ether samples were dissolved in water: 1.0 part by weight of HEMC and 99.0 parts per weight of water. The HEMC (dry basis) was dispersed in water at room temperature (about 25° C.) under stirring to avoid the formation of lumps.

A solution of 50 g HEMC was centrifuged in a Thermo Scientific Sorvall Lynx 4000 Centrifuge for 30 minutes (min) at 13535 UPM. The insoluble material ("insolubles") of the prepared solution will collect at the bottom of the centrifuge vial.

A defined amount of the over-standing solution was weighed and dried over night at 105° C. in a drying cabinet. After weighing the resulting residue, the soluble content was calculated. Subtraction from the starting concentration delivers the insoluble content.

Inventive Examples 1 and 2 and Comparative Examples A-C

In general, HEMC is produced according to the principles of the Williamson ether synthesis. After activation of the ground cellulose with 50% caustic soda, alkalized cellulose is generated. This is followed by etherification with MCl and EO. A useful guide to this method is found, for example, in R. Donges, "Non-Ionic cellulose Ethers", British Polymer Journal Vol. 23, pp. 315-326 (1990). The crosslinking compound used in the process of the present invention is based on diglycidyl ether; and an overview of the characteristics of the crosslinking agent used in the Examples is described in Table II.

A limiting viscosity number (LVN) of the pulp was measured according to the procedure described in ISO 5351 (2010). The ground cellulose flock (400 mol; LVN is greater than or equal to ($\geq$) 1,450 milliliters per gram [mL/g]) was added to a 1,000 liter (L) autoclave (reactor).

After purging the autoclave thrice with $N_2$, the autoclave was heated to 40° C. Then, dimethyl ether (DME, 4.7 mol/mol AGU), and a first charge of methyl chloride ("MCl 1"; 3.2 mol/mol AGU) were added to the autoclave. A first charge of caustic soda ("NaOH 1"; (strength 50%, 1.9 mol NaOH/mol AGU) was added to the mixture in the autoclave in 3 portions during a 2-min period at a temperature of 40° C. The mixture was then held at 40° C. for 30 min. EO (0.45 mol/mol AGU) was then added to the mixture in the autoclave; and the resulting reaction mixture was held for 10 min at 40° C. Then, the crosslinking agent was sprayed into the autoclave reactor.

The crosslinking agent of the inventive process was prepared as an emulsion with water via sufficient mixing of the water and crosslinking agent phase before the emulsion was added to the reactor. Then, immediately after the emulsion was generated, the emulsion was sprayed into the reactor. In a comparative process, a 100% pure crosslinking agent was sprayed into the reaction mixture in the reactor.

The mass formed in the reactor was heated to 80° C. in 45 min. At 80° C., a second charge of MCl ("MCl 2"; 1.3 mol/mol AGU) was injected quickly to the mass. Afterwards, a second charge of caustic soda ("NaOH 2"; 0.67 mol/mol AGU) was added in 7 portions over a 30-min period followed by a 70 min cook-off time at 80° C. After the 70-min cook-off time, the resulting XCE product was formed. The resulting XCE product was then subjected to the following process steps using conventional procedures known in the art: hot water washing, neutralization with formic acid, granulation using a lab granulator (Bosch Mum), drying, and milling.

Comparative Example A, Inventive Example 1 and Inventive Example 2, described in Table II, were carried out using the process of the present invention except that a crosslinking agent was not used in Comparative Example A. Comparative Examples B and Comparative Example C, described in Table III, were carried out using the above-described comparative process.

TABLE II

| Example No. | Viscosity (mPa·s @2.52 s⁻¹ 1% Aqueous Solution) | pH | Amount of Crosslinking Agent (mol/mol AGU) | Information Regarding Crosslinking Agent Dosage | Insolubles (%) |
|---|---|---|---|---|---|
| Comparative Example A | 13,800 | 8.4 | 0 | — | 6 |
| Inventive Example 1 | 17,100 | 8.3 | 0.002 | emulsion 50/50 | 1.9 |
| Inventive Example 2 | 17,470 | 8.3 | 0.001 | emulsion 50/50 | 0 |

The addition of the emulsion of 50% Epilox in water results in a significant increase in viscosity of the 1% aqueous solutions. At the same time, the amount of insoluble material decreases even below the level of the uncrosslinked comparative example.

TABLE III

| Example No. | Viscosity (mPa·s @ 2.51 s⁻¹ 1% Aqueous Solution) | pH | Amount of Crosslinking Agent (mol/mol AGU) | Information Regarding Crosslinking Agent Dosage | Insolubles (%) |
|---|---|---|---|---|---|
| Comparative Example A | 13,800 | 8.4 | 0 | — | 6 |
| Comparative Example B | 7,500 | 8.7 | 0.017 | pure addition | 15 |
| Comparative Example C | 5,090 | 8.6 | 0.017 | pure addition | 20 |

When the crosslinking agent was used as a pure addition, it was observed that the 1% viscosity of the aqueous solution dropped significantly. At the same time, the amount of insoluble material increased indicating an uneven or non-uniform distribution of the crosslinking agent present in the reactor.

What is claimed is:

1. A process for producing a crosslinked cellulose ether comprising contacting an activated cellulose material with (i) an aqueous crosslinking agent emulsion comprising (ia) at least one crosslinking agent and (ib) water; and (ii) at least one etherification reagent; wherein the aqueous crosslinking agent emulsion and the at least one etherification reagent form a reaction mixture which reacts with the activated cellulose material to form the crosslinked cellulose ether; wherein the at least one crosslinking agent is a diglycidyl ether type crosslinking agent having the following chemical Structure (I):

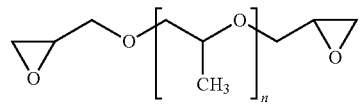

wherein n is selected from 3 to 25; and wherein the crosslinked cellulose ether is a water soluble crosslinked cellulose ether.

2. The process of claim 1, wherein the process includes the steps of:
(A) mixing (ia) at least one crosslinking agent with (ib) water to form an the aqueous crosslinking agent emulsion; and
(B) contacting the activated cellulose material with (Bi) the aqueous crosslinking agent emulsion of step (A) and Bii) at least one etherification reagent; wherein the aqueous crosslinking agent emulsion and the at least one etherification reagent form the reaction mixture which reacts with the activated cellulose material to form the crosslinked cellulose ether.

3. The process of claim 1, further including one or more steps of purifying, washing, drying, granulating, and milling the crosslinked cellulose ether.

4. The process of claim 1, wherein the crosslinked cellulose ether forms at a pressure of greater than or equal to 1,000 kilopascals and at a temperature of greater than 70° C.

5. The process of claim 1, wherein the activated cellulose material is formed by contacting at least one cellulose material with at least one alkalization reagent.

6. The process of claim 5, wherein the at least one cellulose material is selected from the group consisting of wood pulp, cotton linters, and mixtures thereof; and wherein the at least one alkalization reagent is selected from the group consisting of sodium hydroxide, potassium hydroxide, lithium hydroxide, and mixtures thereof in a solution.

7. The process of claim 5, wherein the concentration of the at least one alkalization reagent is from 1 mole of sodium hydroxide per mole of anhydroglucose units of the cellulose material to 3.5 moles of sodium hydroxide per moles of anhydroglucose units of the cellulose material to form the activated cellulose material.

8. The process of claim 5, further including a step of grinding the at least one cellulose material to form a ground cellulose flock material; and
wherein the grinding step is carried out prior to mixing the cellulose material with the alkalization reagent.

9. The process of claim 1, wherein the at least one etherification reagent is selected from the group consisting of ethylene oxide, propylene oxide, butylene oxide, methyl chloride, ethyl chloride, and mixtures thereof.

10. The process of claim 1, wherein the contacting is carried out in an inert atmosphere.

11. The process of claim 1, wherein the amount of crosslinking agent in the aqueous crosslinking agent emulsion is from 10 weight percent to 90 weight percent based on the total weight of the crosslinking agent and water.

12. The process of claim 1, wherein the aqueous crosslinking agent emulsion is present at a concentration of from 0.0001 mole of the crosslinking agent per mole of anhydroglucose units of the cellulose ether to 0.05 mole of the crosslinking agent per mole of anhydroglucose units of the cellulose ether; and wherein the etherification reagent is present at a concentration of from 4 moles of the etherification reagent per moles of anhydroglucose units of the cellulose ether to 6 moles of the etherification reagent per moles of anhydroglucose units of the cellulose ether.

13. The process of claim 2, further including further one or more steps of purifying, washing, drying, granulating, and milling the crosslinked cellulose ether.

* * * * *